April 2, 1968      KI TAE KIM      3,375,705
VISCOSIMETER
Filed Aug. 10, 1964
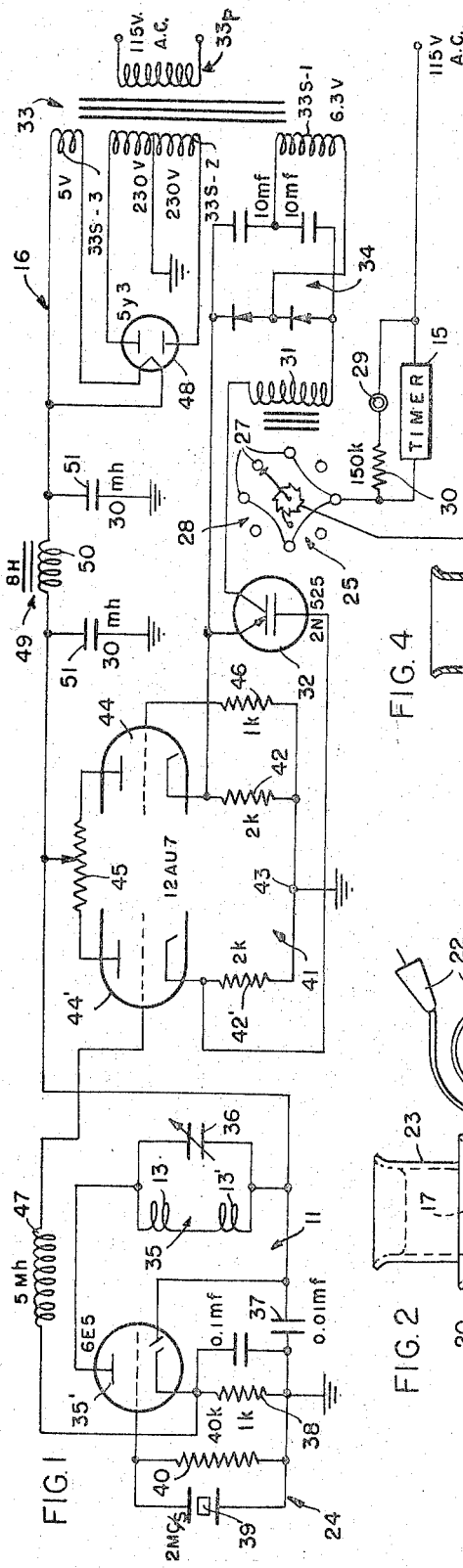
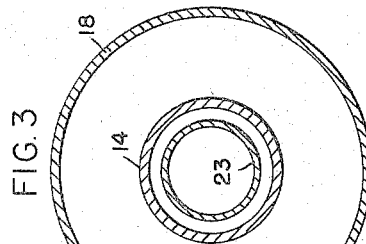
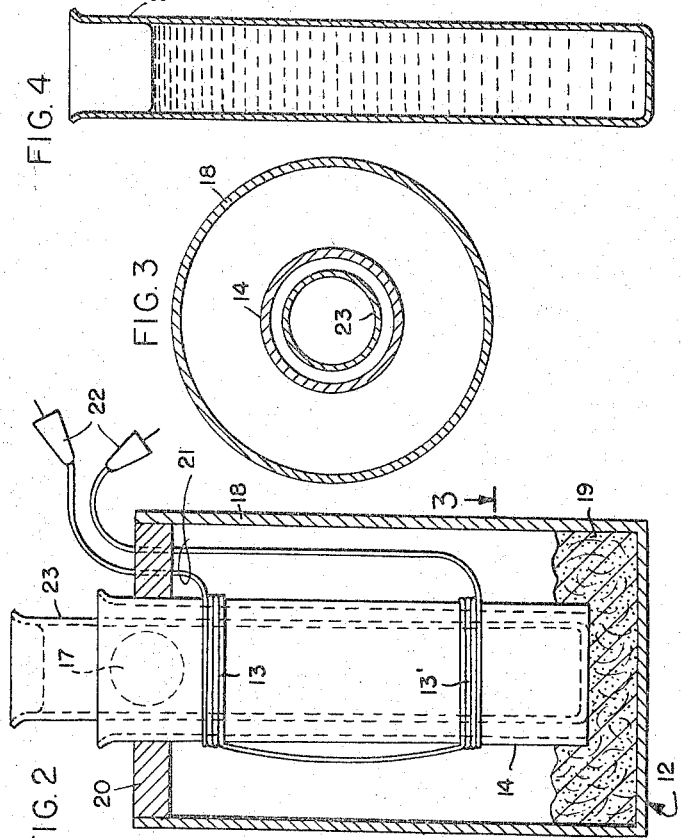
INVENTOR:
KI TAE KIM
BY Morgall Johnston,
Cook & Root
ATTORNEYS

United States Patent Office 3,375,705
Patented Apr. 2, 1968

3,375,705
VISCOSIMETER
Ki Tae Kim, Chicago, Ill., assignor to The Sherwin-Williams Company, Cleveland, Ohio, a corporation of Ohio
Filed Aug. 10, 1964, Ser. No. 388,546
1 Claim. (Cl. 73—57)

The present invention relates in general to the measurement of the viscosity of fluids, and has more particular reference to an improved apparatus for measuring viscosity in terms of the elapsed time required for a weighted test member to gravitate along a path of selected length through the liquid being tested.

An important object of the present invention is to provide electrically controlled timing apparatus for accurately measuring the speed at which a preferably spherical body of selected size and weight will travel, under the influence of a moving force of constant intensity, between spaced timing stations in a column of viscous liquid to be tested.

The falling ball method of determining viscosity is based upon the circumstances that resistance to movement of a body in a viscous liquid is proportionate to the viscosity of the liquid. Where the liquid under test is transparent the method may be practiced by visually measuring the speed of a test body sinking in the liquid, under the constant urge of gravity, between vertically spaced test stations; but the method cannot be applied in measuring the viscosity of opaque liquids because of the inability to observe the velocity of the falling body. Accordingly, an important object of the present invention is to provide for timing the movement of a body sinking in a liquid, under the influence of gravity, without visual observation thereof.

Briefly stated, the present invention may be practiced by providing apparatus for guiding the fall of a test body, such as a ball or sphere of steel or other paramagnetic material, along a selected path in a body of liquid to be tested, past vertically spaced apart timing stations, including timing coils disposed at the stations having electrical characteristics, such as an inductive reactance, adapted to be altered by and in response to the movement of the test ball through the timing stations, a timing device and electronic circuitry for actuating the timing device in response to the movement of the test body past the timing stations, said circuitry preferably including high frequency oscillator means for actuating a bridge circuit in order to measure the change in the electrical characteristics of the pick-up coils at said timing stations and to produce signals for starting and stopping the associated timing device in response to the movement of the test ball through the coils successively at the timing stations.

The foregoing and numerous other important objects, advantages and inherent functions of the invention will become apparent as the same is more fully understood from the following description, which, taken in connection with the accompanying drawings, discloses a preferred embodiment of the invention.

Referring to the drawings:

FIG. 1 is a diagram of electronic components and circuitry forming the viscosimeter;

FIG. 2 is a sectional view through a viscosimeter test cell embodying the present invention;

FIG. 3 is a sectional view taken substantially along the line 3—3 in FIG. 2;

FIG. 4 is a sectional view of a component of the apparatus shown in FIG. 2; and

FIG. 5 is a side view of a test body.

To illustrate the invention, the drawings show a viscosimeter 11 comprising a test cell 12 embodying a pair of axially spaced coils of wire 13, 13' mounted on a holder 14, a timer 15, and electrical circuitry 16 operable to start and to stop the timer in response to the passage of a test body or ball 17, preferably of metal such as steel, successively through the coils 13, 13'.

The test cell 12 may conveniently comprise an outer housing 18, such as an open top jar, of glass or other suitable material, containing a preferably sponge rubber mat or pad 19 in the bottom of the jar for the purpose of resiliently supporting the lower end of the coil holder 14. This holder may conveniently comprise a preferably cylindrical sleeve of any suitable material upon which the coils of wire 13, 13' may be applied and secured in the desired axially spaced relation on the sleeve. The upper end of the housing 18 may be provided with a collar 20 having an opening through which the upper end of the coil carrying sleeve 14 may project outwardly of the housing. The axially spaced wire coils 13, 13' may be interconnected together in series or parallel relation and provided with lead conductors 21 which may extend outwardly of the housing 18 through openings formed in the collar 20, the outwardly projecting ends of the conductors 21 being provided with connection plugs 22 to facilitate electrical connection in the electrical translation circuitry 16.

A sample of liquid to be measured in the viscosimeter may be placed in a sample holder 23, which may conveniently comprise an open-ended test tube, as of glass or other suitable material, the tube preferably having sectional size and configuration permitting it to fit snugly, yet slidably, within the coil holder 14, so that the sample holder may be easily applied into viscosity determining position within the coil holder and as easily removed. Suitable resilient cushioning means may be provided in the bottom of the coil holder for supporting the lower closed end of the sample holder 23 at a desired testing elevation in the coil holder. The sample holder of course should be of diametral size somewhat greater than the diameter of the test ball 17, to permit the same to sink freely through the liquid to be tested in the sample holder, so that the sinking movement of the test ball will be resisted only by the viscosity of the liquid being tested in the holder.

In determining the viscosity of a sample in the holder 23 it is merely necessary to fill it substantially completely with the liquid to be tested. In any event, the holder should contain a sufficient quantity of liquid to present the level of liquid under test appreciably above the uppermost test coil 13, when the sample holder is in testing position within the coil holder. The test body or ball 17 may then be dropped into the sample holder through its open upper end and allowed to sink through the liquid in the holder 23. When the ball reaches the uppermost test coil 13 it will alter the inductive characteristics of the coil due to the change in its magnetic field and eddy current losses caused by the presence of the ball in such field. This inductive change, by action of the electronic circuitry 16 may be applied to start the timer 15 in operation; and the timer may be stopped, as a result of the inductive change produced in the lowermost coil 13' when the test ball 17 enters its magnetic field, after sinking through the liquid in the sample holder 23 between the timing coils 13 and 13'.

It will be seen from the foregoing that viscosity is determined, in accordance with the teachings of the present invention, entirely as a result of the alteration of the inductive characteristics of the timing coils 13 and 13' and is not dependent upon the visibility of the falling ball. As a consequence, apparatus embodying the present invention may be employed to determine the viscosity of entirely opaque liquids, which is an importantly valuable aspect of the present invention.

As shown, the measuring cell may comprise a pair of inductive coils wound on a tube of glass or other suitable insulating material; and these coils may be connected together either in series or in parallel. Since they are mounted on a common support, the axial spacement of the coils remains fixed.

In order to apply the variations in the inductance of the coils 13, 13′ to start and stop the timer, the coils are connected to control the operation of a high frequency oscillating system 24, the output of which may be suitably amplified and applied to control the operation of a timer actuating relay 25. In this connection, any suitable or preferred timer of conventional character may be employed. As shown, the timer 15 may be connected with a source of electrical power 26, such as a conventional 110–120 volt A.C. source, by means of the switching contacts 27 of the relay 25. The relay 25 may conveniently comprise a rotary stepping switch 28 operable to alternatively connect the timer to and disconnect the same from the power source 26. If desired, a preferably neon type tell tale or pilot lamp 29 may be connected across the timer in series with a suitable ballast resistance, such as the 150,000 ohm resistor 30, to show when the timer is in operation.

The actuating coil 31 of the timer relay 25, may be energized from a suitable power source under the control of an amplifier, such as the 2N525 transistor 32. As shown, the relay coil 31 may be energized from the 6.3 volt secondary winding 33s–1 of a transformer having a primary winding 33p adapted for connection with a suitable power source, such as a conventional 110–120 volt A.C. source. As shown, the coil 31 is connected between the collector of the transistor and one side of a voltage doubling and rectifying circuit 34, the other side of which is connected to the emitter of the transistor, the voltage doubling and rectifying circuit being in turn connected to the transformer winding 33s–1.

The oscillating system may conveniently comprise a tank circuit 35 consisting of the coils 13, 13′ in parallel with a variable condenser 36 and a conventional 6E5 Radiotron 35′, which comprises an electron flow device embodying a cathode connected to ground through a 1,000 ohm resistor 38 in parallel with a 0.1 microfarad condenser, the tank circuit being connected between the anode or plate of the Radiotron and ground, with a 0.01 microfarad condenser 37 connected between ground and the tank circuit. The oscillating frequency of the system may be regulated by means of a fixed frequency crystal 39 connected in parallel with a 40,000 ohm resistor 40 between ground and the control element or grid of the Radiotron. The cathode heating filament of the Radiotron may be energized by connection with the transformer windings 33s–1. The oscillating system goes into oscillation when the frequency of the tank circuit approaches the oscillating frequency of the crystal which is a constant. The condenser 36 is adjusted or is selected to normally condition the system for oscillation so long as the test ball 17 is not in position to influence the magnetic field of either of the coils 13, 13′.

When the system is in oscillation, the voltage drop between the cathode of the Radiotron and ground is low; but the voltage on the cathode with respect to ground increases somewhat whenever oscillation stops. This voltage increase may be applied to actuate the relay to start the timer, when the test ball enters the magnetic field of the upper coil 13, and to stop the timer when the ball comes into the field of the lower coil 13′, whereby the viscosity of the test sample in the holder 23 may be determined in terms of elapsed time shown by the timer. The difference between the cathode to ground voltage of the Radiotron when oscillating and when not in oscillation is small as compared with the ratio of relay pull in to releasing current. As a consequence conventional amplification cannot be satisfactorily employed between the oscillating system 24 and the relay 25.

In order to apply the voltage differential which appears on the cathode of the Radiotron 35′ during the oscillating and non-oscillating phases of the system 24, a differential amplifier 41 may be employed, said amplifier comprising a Wheatstone type bridge circuit, two legs of which comprise resistors of like value, such as the 2,000 ohm resistor units 42, 42′. Corresponding ends of the resistance elements may be connected together and grounded, as shown at 43. The ground remote ends of the resistance elements may be connected respectively with the cathodes of preferably identical Radiotrons 44, 44′ which comprise electron flow valve units forming the remaining legs of the bridge. These identical Radiotrons may comprise the half sections of a 12AU7 double Radiotron tube. The anodes of the identical Radiotrons may be interconnected through the resistance element of a preferably 200,000 ohm potentiometer 45, the adjustable element of which is connected with the side of the tank circuit 35 which is connected to ground through the condenser 37. The control element or grid of one of the identical Radiotrons 44, 44′ may be tied to ground through a resistor such as the 1,000 ohm resistance element 46, the control element or grid of the other of said identical Radiotrons being connected with the cathode of the Radiotron 35′ of the oscillating system 24, preferably through a R.F. choke coil such as the 5 milli henrys coil 47.

The cathodes of the Radiotrons 44, 44′ may be connected respectively with the emitter and with the base of the transistor amplifier 32, as shown. The cathode exciting filaments of the Radiotrons 44, 44′ may be connected with and energized by the secondary winding 33s–1 of the transformer 33.

The transformer 33 may also embody a secondary winding 33s–2 having a grounded center tap, to produce a voltage of the order of 230 volts between ground and each end of the winding. The opposite ends of said winding may be connected respectively with the plates of a rectifier tube 48, such as a 5Y3 tube. The cathode of the rectifier tube may be energized from a 5 volt secondary winding 33s–3 of the power supply transformer, in order to provide rectified potential for application to the side of the tank circuit 35 which is connected to ground through the condenser 37. The rectified potential delivered by the tube 48 may be delivered to the tank circuit through a filter system 49, comprising a choke coil, such as the 8 henry coil 50, and a pair of 30 microfarad condensers 51, respectively connected between the opposite sides of the coil 50 and ground.

It will be seen from the foregoing that the resistance units 42, 42′ and the Radiotrons 44, 44′ form the legs of a Wheatstone bridge which may be balanced by adjustment of the potentiometer 45, when the system 24 is in oscillation. When the system 24 ceases to oscillate due to the presence of the test ball 17 in the field of one or other of the coils 13, 13′, the resulting change in voltage at the plate of the Radiotron 35′ unbalances the bridge, since said voltage is applied upon the control grid of one of the Radiotrons 44, 44′. When the bridge thus becomes unbalanced, current will be caused to flow in the circuit, including the emitter and base of the amplifying transistor, thereby delivering relay actuating current through the relay coil 31, for the purpose of advancing the stepping switch 28 to turn the timer 15 on or off.

The present invention provides numerous advantages, including the possibility of viscosity measurement within a wide range of viscosity values; the possibility of obtaining reliable viscosity measurement with the minimal amount of fluid required for testing purposes; the elimination of human error in visually determining the elapsed time of fall of a test body between upper and lower measuring stations; the possibility of obtaining superior accuracy of measurement through the automatic starting and stopping of the viscosity measuring timer; the simplification of test sample preparation, which consists simply of loading a small quantity of the liquid to be tested into an easily cleaned test tube; and the possibility of measuring the viscosity of opaque liquids, such as paints and the like, as well as transparent liquids, with the same degree of accuracy.

If desired, an indicating device, such as a lamp, bell or other sensible signaling device, may be substituted for the timer 15 so as to indicate the start and end of a timing interval. For example, the timer 15 in the illustrated embodiment could be disconnected and the pilot light 29 used as a timing device in conjunction with a portable elapsed time measuring device, such as a stopwatch, to perform the timing operation in response to the visual, audible, or other sensible signal emitted by the timing device.

It is thought that the invention and its numerous attendant advantages will be fully understood from the foregoing description, and it is obvious that numerous changes may be made in form, construction and arrangement of the several parts without departing from the spirit or scope of the invention, or sacrificing any of its attendant advantages, the form herein disclosed being a perferred embodiment for the purpose of demonstrating the invention.

The invention is hereby claimed as follows:

1. A viscosimeter comprising means for supporting a column of liquid to be tested at a testing station, a pair of coils forming sensing elements vertically spaced along and encircling said column and capable of reacting to the presence of a test body immersed therein at the elevation of said coils, timing means, a stepping switch having an operating coil and switch contacts operatively connected with said timing means to turn the same on and off in response to successive operations of the stepping switch, an oscillating system including an electron flow device having an anode, a cathode and a control element, a tank circuit including said coils disposed in parallel relation with a tank condenser, said tank circuit being connected between the anode of said electron flow device and ground, through a condenser, a control crystal connected in parallel with a resistor between the control element of the electron flow device and ground, the cathode of the electron flow device being isolated from ground by a resistor connected in parallel with a condenser, the tank condenser having a capacity selected to cause the system normally to oscillate and to produce a potential with respect to ground on the cathode of the electron flow device, so long as the test body is not in position to be sensed by either of said coils, a bridge circuit embodying like bridge resistors and like electron-flow valve units forming the legs of the bridge circuit, said bridge resistors having interconnected and grounded ends and ground remote ends each connected with the cathode of a corresponding electron flow valve unit, a potentiometer having a resistance element interconnecting the anodes of the electron-flow valve units and an adjustable contact connected with the oscillating system at the condenser connected side of the tank circuit, the control grids of the electron-flow valve units being respectively connected with the cathode of the electron-flow device, through a choke coil and with ground through a resistor, whereby the bridge circuit may be balanced by adjustment of the potentiometer to equalize the potentials with respect to ground that appear on the cathodes of the bridge electron-flow valve units, when the oscillating system is in oscillation, a transistor forming an amplifier having its emitter and its base connected respectively with the cathodes of the electron-flow valve units, the collector of said amplifier being connected with one end of the actuating coil of the stepping switch, means for applying electrical potential between the other end of said actuating coil and the emitter of the transistor, and means for applying unidirectional potential on the oscillating system at the condenser connected side of the tank circuit.

References Cited

UNITED STATES PATENTS

| 2,252,572 | 8/1941 | Lang | 73—57 |
| 2,896,131 | 7/1959 | Schumann. | |
| 3,026,716 | 3/1962 | Connally | 73—57 |
| 3,046,479 | 7/1962 | Mead et al. | 324—61 |
| 3,240,053 | 3/1966 | Jones | 73—57 |

DAVID SCHONBERG, *Primary Examiner.*

L. R. PRINCE, *Examiner.*